(12) United States Patent
Schneider et al.

(10) Patent No.: US 6,333,094 B1
(45) Date of Patent: Dec. 25, 2001

(54) MULTILAYER THERMOFORMABLE COMPOSITE SYNTHETIC VENEER FILM FOR FURNITURE AND PROCESS FOR PRODUCING SAME

(75) Inventors: Manfred Schneider, Hagenheim-Hofstetten; Egon Ewald, Munich, both of (DE)

(73) Assignee: Alkor GmbH Kunststoffe, Munich (DE)

( * ) Notice: Subject to any disclaimer, the term of this patent is extended or adjusted under 35 U.S.C. 154(b) by 0 days.

(21) Appl. No.: 09/398,206

(22) Filed: Sep. 17, 1999

(30) Foreign Application Priority Data

Sep. 19, 1998 (DE) .............................. 198 43 029
Jul. 14, 1999 (DE) .............................. 199 32 835
Aug. 2, 1999 (DE) .............................. 199 36 304

(51) Int. Cl.⁷ .......................... B32B 27/08; B32B 27/30; B32B 27/32; B32B 27/36

(52) U.S. Cl. .......................... 428/201; 428/195; 428/200; 428/203; 428/212; 428/213; 428/214; 428/215; 428/354; 428/355 N; 428/355 EN; 428/355 AC; 428/337; 428/480; 428/483; 428/515; 428/516; 428/519; 428/520; 428/521; 428/522; 428/523; 525/88; 525/92 R; 525/90; 525/95; 525/98; 525/191; 525/240

(58) Field of Search .................. 428/35.7, 36.9, 428/212, 195, 201, 203, 205, 480, 483, 522, 523, 213, 214, 215, 337, 354, 355 R, 355 EN, 355 AC, 355 N, 515, 516, 519, 520, 521; 525/88, 92 R, 90, 95, 98, 191, 240, 241

(56) References Cited

U.S. PATENT DOCUMENTS

| 4,087,485 | * | 5/1978 | Huff ................................ 260/897 A |
| 4,701,496 | * | 10/1987 | Yoshimura et al. ................ 525/240 |
| 4,778,697 | * | 10/1988 | Genske et al. ....................... 428/35 |
| 5,273,797 | * | 12/1993 | Hazelton et al. .................. 428/34.7 |

FOREIGN PATENT DOCUMENTS

522 240    1/1993    (EP) .

* cited by examiner

Primary Examiner—Vivian Chen
(74) Attorney, Agent, or Firm—Foley & Lardner (57) ABSTRACT

The present invention relates to a multilayer thermoformable composite synthetic veneer film, furniture parts produced therefrom, and a process for producing the same. The base layer comprising polyolefin has a thickness of 100 to 500 $\mu$m and a particular composition and is composed of at least three different polyolefins. The film also includes at least one intermediate layer in the form of at least one primer layer, bonding layer or bonding film or, respectively, bonding layer; an optional printing layer, coloring layer or color-printing layer arranged over part or all of the surface; at least one polyester-containing single- or multiple-layer-structure layer or film; at least one bonding layer, adhesion-promoting layer or reactant layer on the side of the base layer that is to be applied to a substrate; and a surface-covering layer on the top of the film.

35 Claims, 2 Drawing Sheets

MULTILAYER THERMOFORMABLE COMPOSITE SYNTHETIC VENEER FILM FOR FURNITURE AND PROCESS FOR PRODUCING SAME

BACKGROUND OF THE INVENTION

The present invention relates to a thermoformable composite synthetic veneer film having more than one layer and to furniture parts produced therewith, as well as to a process for production and for use of the film.

The film comprises: at least one base film or base layer comprised at least partly of polyolefin and having a thickness of 100 to 500 μm, which comprises, based on 100 parts by weight of polyolefin, from 0 to 90 parts by weight of at least one inorganic and/or organic filler, pigment or filler-pigment mixture and at least one UV stabilizer, and also the customary processing aids (antioxidants, phosphites, lubricants); at least one intermediate layer in the form of at least one primer layer, bonding layer or bonding film; and, arranged directly thereupon or onto a printing layer, coloring layer or color-printing layer arranged over part or all of the surface and, arranged directly thereupon or onto a bonding layer, at least one polyester-containing single- or multiple-layer-structure layer or film, where at least one bonding layer, adhesion-promoting layer or reactant layer has been arranged (on the side facing the working material) below the base film or base layer. According to the invention, the intermediate layers and the polyester-containing layers or films have a particular composition or, respectively, a particular structure.

EP 0 522 240 B1 discloses a composite synthetic-polymer film having more than one layer and comprising at least one base layer or base film based on at least one polyolefin, and, arranged below the base film or base layer, at least one bonding layer, bonding film, adhesion-promoting layer and/or reactant layer, and comprising, arranged above the base layer or base film, at least one upper layer or film. According to EP 0522240 the base film or base layer of polyolefin or comprising polyolefin is from 60 to 700 μm in thickness and comprises, based on 100 parts by weight of polyolefin, from 5 to 150 parts by weight of at least one inorganic and/or organic filler, pigment or filler-pigment mixture, and at least one UV stabilizer and/or a heat stabilizer and/or an antioxidant, and has, arranged thereupon, at least one intermediate layer in the form of at least one primer bonding layer or bonding film and, arranged over part or all of the surface thereof, at least one printing layer, coloring layer or color-printing layer, and, arranged directly thereupon or onto one or more intermediate layers, at least one polymethyl methacrylate-containing, polyamide-containing and/or polyester-containing single- or multiple-layer-structure protective layer or protective film. The film can be used outdoors or else as a veneer film. However, it is thermoformable only at very high temperatures (150° C.) and, in addition, it has a very narrow processing range (±2.5° C.).

SUMMARY OF THE INVENTION

One objective of the present invention is to develop an improved composite synthetic-polymer film for furniture. This should, inter alia, have good thermoformability even at low temperatures (100° C.) and a significantly broader processing range (from 90 to 130° C.). The film should also have improved surface properties (scratch resistance, chemical resistance) and good adhesion properties on wood materials, wood parts, plasterboard or metal.

In accomplishing these and other objects, there has been provided according to one aspect of the present invention a multilayer thermoformable composite synthetic film, comprising:

(1) at least one base layer comprising polyolefin and having a thickness of 100 to 500 μm, which comprises, based on 100 parts by weight of polyolefin, from 0 to 90 parts by weight of (i) at least one inorganic and/or organic filler, pigment or filler-pigment mixture, (ii) at least one UV stabilizer and/or (iii) heat stabilizer and/or (iv) antioxidant, wherein the base layer comprises (a) at least one propylene copolymer with moderate or high ethylene content sufficient to provide a Vicat softening point VST/A/50 of from 110 to 130° C. and a melt index MFR (230/2.16) of from 1 to 10 g/10 min, (b) at least one polyethylene, and (c) at least one polyethylene elastomer or polyethylene-containing elastomer;

(2) at least one first intermediate bonding layer;

(3) at least one polyester-containing layer comprising an amorphous polyester having a Vicat softening point VST/A/50 of from 60 to 90° C.;

(4) at least one bonding layer, adhesion-promoting layer or reactant layer arranged on the underside of the base layer; and (5) a surface-covering layer arranged on top of the film.

According to another aspect of the invention, there has been provided a process for producing a multilayer thermoformable composite synthetic veneer film as defined above, comprising extruding at least one layer of said film, including the base layer, wherein the base layer is adjusted to a Vicat softening point VST/A/50 of from 70 to 80° C., and/or the melt index MFR (230° C./2.16) of the propylene copolymer is selected at 20 to 8 g/10 min, prior to the extrusion.

According to still another aspect of the invention, there is provided a process for producing furniture parts using the above film, which comprises applying, in a thermoforming process and at temperatures of from 80 to 140° C. the veneer film to a previously produced part of wood or of wood materials, or boards of wood or of wood materials or comprising wood fibers, using the bonding layer, adhesion-promoting layer or reactant layer arranged below the base layer, and bonding to the parts or boards of wood or of wood materials.

Finally, there has also been provided according to the invention a laminated article comprising a base part made from wood or from wood materials, a board made from wood or wood materials, plasterboard, metal, or a part or sheet made from metal, laminated with a film as defined above.

Further objects, features and advantages of the present invention will become apparent from the detailed description of preferred embodiments set forth below, when considered in conjunction with the accompanying figures of drawing.

DETAILED DESCRIPTION OF THE PREFERRED EMBODIMENT

According to the invention a thermoformable composite synthetic veneer film having more than one layer, or furniture parts produced therewith, comprise:

at least one base film or base layer of polyolefin or comprising polyolefin and having a thickness of 100 to 500 μm which comprises, based on 100 parts by weight of polyolefin, from 0 to 90 parts by weight of at least one inorganic and/or organic filler, pigment or filler-pigment mixture and at least one UV stabilizer and/or heat stabilizer and/or antioxidant;

at least one intermediate layer in the form of at least one primer layer, bonding layer or bonding film or, respectively, bonding layer and, arranged directly thereupon or onto a printing layer, coloring layer or color-printing layer arranged over part or all of the surface and, arranged directly thereupon or onto a bonding layer;

at least one polyester-containing single- or multiple-layer-structure layer or film; and at least one bonding layer, adhesion-promoting layer or reactant layer arranged below the base film or base layer.

According to the invention, the polyolefin-containing base layer or base film has at least one propylene copolymer with moderate or high ethylene content, preferably a random copolymer, and/or a propylene terpolymer (a) which has or, respectively, have a Vicat softening point VST/A/50 of from 110 to 130° C., and a melt index MFR (230/2.16) of from 1 to 10 g/10 min.

The base layer or base film also comprises at least one polyethylene (b), preferably LDPE, LLDPE, VLDPE and/or VLLDPE, and also at least one polyethylene elastomer or polyethylene-containing elastomer (c), or the base layer is composed, based on synthetic polymer, of these constituents. The composite synthetic veneer film also features one or more films or layers of polyester or comprising polyester, or is composed of the same, of which at least one polyester layer or polyester-containing layer or film comprises an amorphous polyester or is composed of the same, where at least one, or the entire, film or layer of polyester or comprising polyester has a Vicat softening point VST/A/50 of from 60 to 90° C. A surface-coating layer has been arranged on top of the film or layer of polyester or comprising polyester.

In a preferred embodiment of the invention, the polyethylene elastomer or polyethylene-containing elastomer (c) is a butene-containing, hexene-containing or octene-containing, or butene-modified, hexene-modified or octene-modified, polyethylene elastomer or polyethylene-containing elastomer, which has a melt index MFR (190/2.16) of from 3 to 8 g/10 min. In a particularly useful embodiment, the butene-containing, hexene-containing or octene-containing, or butene-modified, hexene-modified or octene-modified, polyethylene elastomer or polyethylene-containing elastomer has a butene content, hexene content or octene content of from 10 to 35% by weight, preferably from 20 to 30% by weight (based on 100 parts by weight of elastomer).

The LDPE, LLDPE, VLDPE and/or VLLDPE (b) present in the base film or base layer is with preference an octene-containing or octene-modified LDPE, LLDPE, VLDPE and/or VLLDPE, preferably an octene-containing or octene-modified LLDPE.

The above-mentioned embodiment has the advantage of rendering polyolefins thermoformable as low as in regions from 90 to 110° C., comparable with unplasticized PVC films.

In a preferred embodiment the polyolefin-containing base layer or base film comprises from 35 to 65 parts by weight, preferably from 45 to 55 parts by weight, of propylene copolymer and/or of propylene terpolymer (a) and from 20 to 40 parts by weight, preferably from 25 to 35 parts by weight, of butene-containing, hexene-containing or octene-containing, or butene-modified, hexene-modified or octene-modified, polyethylene elastomer (c) or polyethylene-containing elastomer, and also from 10 to 30 parts by weight, preferably from 15 to 25 parts by weight, of LDPE, LLDPE, VLDPE and/or VLLDPE with an MFR (190/2.16) or from 2.5 to 7.5 g/10 min, preferably LLDPE, as synthetic polymer constituents, or is composed of the same.

In another embodiment, up to 60% by weight, preferably up to 20% by weight (based on LDPE, LLDPE, VLDPE and/or VLLDPE) of the base film or base layer are replaced by the same weight of polyvinyl alcohol, ethylene-vinyl alcohol copolymer, ethylene-acrylate-acrylate polymer (EAA) or polycaprolactone, or mixtures or, respectively, alloys of LLDPE, LDPE, VLDPE and/or VLLDPE with one or more of the above-mentioned polymers or co- or terpolymers.

From 0 to 70 parts by weight, preferably from 0 to 50 parts by weight, particularly preferably from 40 to 50 parts by weight, of fillers (based on 100 parts by weight of polymer) are also present in the base layer or base film. In another preferred embodiment there is no filler, or a filler content of less than 10 parts by weight, in the base layer or base film.

Between the polyolefin-containing base layer or base film and the polyester layer or polyester-containing layer or film the arrangement also preferably includes an adhesion-promoting layer which preferably has a melt index MFR (190/2.16) of from 3 to 7 g/10 min. The base film or base layer particularly preferably comprises E/GMA (ethylene-glycidyl methacrylate copolymer) and/or E/MA/GMA (ethylene-methacrylate-glycidyl methacrylate terpolymer), preferably with a melt index MFR (190/2.16) of from 3.5 to 6 g/10 min, or is composed thereof. The E/GMA copolymer here is preferably composed of 8% by weight of glycidyl methacrylate and 92% by weight of ethylene, whereas the E/MA/GMA terpolymer is preferably composed of from 21 to 27% by weight of methacrylate, 71% by weight of ethylene and from 2 to 8% by weight of glycidyl methacrylate. In one embodiment, the polyester layer or polyester-containing layer or film together with the adhesion-promoting layer has preferably been coextruded.

In another preferred embodiment, the ethylene content of the propylene copolymer, preferably a random propylene copolymer, in the base film is typically from 2 to 8% by weight, preferably from 2 to 6% by weight, particularly preferably from 2.5 to 3.5% by weight, based on the propylene copolymer.

The Vicat softening point VST/A/50 of at least one, or of the entire, base layer(s) or base film(s) is from 60 to 90° C. and/or the melt index of the propylene copolymer MFR (230/2.16) is from 2 to 8 g/10 min, preferably from 3 to 7 g/10 min. This makes polyolefins thermoformable at temperatures as low as in regions from 90 to 110° C., comparable with unplasticized PVC films, and achieves a good homogeneous mixture which ensures constant film properties throughout.

According to the invention the arrangement includes, on the underside of the base film or base layer, at least one water-soluble, water-swellable or water-insoluble filler-containing bonding layer, adhesion-promoting layer and/or a reactant layer. In the case of the water-soluble or water-swellable bonding layer or reactant layer, it comprises, alongside a binder, an agent reacting with the adhesive layer to be applied, or comprises a water-soluble cationic polymer, preferably polyimine. In the case of a water-insoluble or low-water-solubility bonding layer or adhesion-promoting layer, it comprises a low-water-solubility or water-insoluble synthetic resin containing polar groups or a synthetic polymer containing polar groups, preferably at least one polyacrylate, polyester, polyurethane and/or a polyisocyanate, or is composed of the same.

In another preferred embodiment, the reactant layer arranged below the base film or base layer comprises a water-soluble, water-dispersible or water-swellable synthetic polymer and at least one water-soluble or water-dispersible reactive compound, preferably at least one organic acid, an acid anhydride and/or a compound of acid reaction. This layer improves the bonding of the adhesive layer, e.g., in combination with a two- or multicomponent adhesive or with a thermosetting adhesive.

In another preferred embodiment, the water-soluble reactant layer comprises, as water-soluble synthetic resin, a water-soluble acrylate homo-, co- or terpolymer and/or a water-soluble methacrylate homo-, co- or terpolymer and/or, as acid, acid anhydride or compound of acid reaction, at least one water-soluble organic di- and/or polycarboxylic acid and/or anhydrides thereof, or compound of acid reaction, preferably maleic acid, maleic anhydride, a water-soluble organic acid containing a sulfur atom, a sulfonic acid, derivatives or esters thereof, preferably p-toluenesulfonic acid and/or a polysulfonic acid, or a mixture of two or more of these compounds. Alternately, it is composed of the combination of one or more of these water-soluble synthetic resins and one or more of these water-soluble acids, acid anhydrides or compounds of acid reaction.

Above the printing layer, coloring layer or color-printing layer and/or below the layer or film of polyester or comprising polyester the arrangement also preferably includes at least one bonding layer or adhesion-promoting layer as an intermediate layer which is transparent and low in filler (less than 3% by weight of fillers, preferably less than 1.5% by weight of fillers) or is free from fillers.

The bonding layer or adhesion-promoting layer preferably comprises a polyurethane, a polyisocyanate, a vinyl chloride homo-, co- or terpolymer, and/or polyvinyl acetate and/or a vinyl chloride-vinyl acetate copolymer (PVC/PVA copolymer) or a mixture of two or more of these synthetic polymers, as binder.

In one embodiment, the synthetic polymer layer or synthetic resin layer or synthetic polymer adhesion-promoting layer or synthetic resin adhesion-promoting layer arranged above the base film or base layer of the plastic film comprises a reaction product of a crosslinkable polyacrylate containing OH groups in combination with a polyisocyanate, preferably hexamethylene diisocyanate, and/or comprises an alloy or mixture of one or more of these compounds with one another, or is composed of the same. For the bonding layer, a polyacrylate containing OH groups and having from 1.5 to 5% by weight of OH groups (based on the polyacrylate containing OH groups) is preferably used or is present in the bonding layer, and/or the polyisocyanate has an isocyanate content of from 1 to 5% by weight (based on the entire reaction product), or the bonding layer has been produced using these components.

The bonding layer therefore usefully comprises an acrylate homo-, co- and/or terpolymer containing OH groups, preferably in combination with a polyisocyanate, or a methacrylate homo-, co- and/or terpolymer containing OH groups and a polyisocyanate, preferably hexamethylene diisocyanate, and/or comprises an alloy or a mixture of one or more of these compounds with one another, or is composed of the same.

The layer(s) or film(s) of polyester or containing polyester is/are transparent or translucent, and comprises or, respectively, comprise from 0 to 8% by weight of filler (based on the entire polyester layer(s) or polyester film(s)), preferably no filler, and has, or respectively, have a layer thickness of from 20 to 250 $\mu$m, preferably from 50 to 200 $\mu$m (based on the entire layer thickness of) and/or at least one, or the entire, layers or film of polyester or containing polyester has, or, respectively have a Vicat softening point VST/A/50 of from 60 to 90° C.

In a preferred embodiment, the propylene terpolymer in the base layer or base film comprises a butene content, hexene content or octene content of from 2 to 30% by weight, preferably from 8 to 20% by weight.

Preferably, directly below the base film or base layer or below the bonding layer, adhesion-promoting layer or reactant layer arranged below the base film or base layer, a hot-melt adhesive based on polyurethane, polyamide, polyethylene or polypropylene has been applied at a layer thickness of from 30 to 200 $\mu$m.

In a preferred embodiment, the finely divided mineral filler preferably used in the base layer or base film in amounts of from 0 to 70 parts by weight, or the mineral filler mixture, preferably calcium carbonate, comprises microtalc, kaolin and/or silica gel and/or at least one reactive substance, using, as reactive substance, from 0.5 to 10% by weight, preferably from 1 to 5% by weight (based on 100 parts by weight of filler and filler mixture) of at least one substance having polar and nonpolar groups which has preferably been arranged on the surface or on a portion of the surface of the filler or filler mixture.

Substances such as stabilizers and lubricants can be added to improve homogenization of the mixture as a result of better shear during processing.

The invention also provides a process for producing a thermoformable composite synthetic veneer film having more than one layer, or furniture parts produced therewith, comprising at least one base film or base layer of polyolefin or comprising polyolefin and having a thickness of 100 to 500 $\mu$m which comprises, based on 100 parts by weight of polyolefin, from 0 to 90 parts by weight of at least one inorganic and/or organic filler, pigment or filler-pigment mixture and at least one UV stabilizer and/or heat stabilizer and/or antioxidant, at least one intermediate layer in the form of at least one primer layer, bonding layer or bonding film or, respectively, bonding layer and, arranged directly thereupon or onto a printing layer, coloring layer or color-printing layer arranged over part or all of the surface and, arranged directly thereupon or onto a bonding layer, at least one polyester-containing single- or multiple-layer-structure layer or film, where at least one bonding layer, adhesion-promoting layer or reactant layer has been arranged (on the side facing the working material) below the base film or base layer. According to the invention, the polyolefin-containing base layer or base film used is a synthetic polymer mixture comprising or composed of at least one propylene copolymer (a) with moderate or high ethylene content, preferably a random propylene copolymer, and/or propylene terpolymer which has or, respectively, have a Vicat softening point VST/A/50 of from 110 to 130° C. and a melt index MFR (230/2.16) of from 1 to 10 g/10 min, and of at least one polyethylene elastomer (b), of at least one polymethylene (c), preferably LDPE, LLDPE, VLDPE and/or VLLDPE, and that the arrangement includes one or more film(s) or layer(s) of polyester or comprising polyester, of which at least one polyester layer or polyester-containing layer or film comprises an amorphous polyester. At least one, or the entire, film or layer of polyester or comprising polyester here is adjusted to a Vicat softening point VST/A/50 of from 60 to 90° C. A surface-coating layer is applied directly to the polyester layer or polyester-containing layer or film.

The polyethylene elastomer or polyethylene-containing elastomer used in the base layer or base film (2) here is a butene-containing, hexene-containing or octene-containing, or butene-modified, hexene-modified or octene-modified, polyethylene elastomer or polyethylene-containing elastomer which has a melt index MFR (190/2.16) of from 3 to 8 g/10 min.

The LDPE, LLDPE, VLDPE and/or VLLDPE used in the base layer in the process is an octene-containing or octene-modified LDPE, LLDPE, VLDPE and/or VLLDPE, preferably an octene-containing or octene-modified LLDPE. The butene-containing, hexene-containing or octene-containing, or butene-modified, hexene-modified or octene-modified, polyethylene elastomer or polyethylene-containing elastomer used is one with a butene content, hexene content or octene content of from 10 to 35% by weight, preferably from 20 to 30% by weight (based on 100 parts by weight of elastomer).

In the novel process, the polyolefin-containing base layer (s) or base film(s) comprising or composed of (as synthetic resin binder) a mixture of from 35 to 65 parts by weight, preferably from 45 to 55 parts by weight, of propylene copolymer and/or propylene terpolymer and from 20 to 40 parts by weight, preferably from 25 to 35 parts by weight, of butene-containing, hexene-containing or octene-containing, or butene-modified, hexene-modified or octene-modified elastomer of polyethylene or containing polyethylene, and also from 10 to 30 parts by weight, preferably from 15 to 25 parts by weight, of LDPE, LLDPE, VLDPE and/or VLLDPE with an MFR (190/2.16) of from 2.5 to 7.5 g/10 min, preferably LLDPE, is or, respectively, are calendered and/or coextruded and/or extruded with prior adjustment of the Vicat softening point VST/A/50 of at least one, or of the entire, base layer(s) or film(s) to 70–80° C. and/or with selection of the melt index of the propylene copolymer MFR (230° C./2.16) to 2–8 g/10 min, preferably 3.1–6 g/10 min.

Preferably, the film(s) or layer(s) of polyester or comprising polyester, preferably the layers or films are combined with the polyolefin-containing base film or base layer and, if desired, film(s) (1, 3 and/or 9 or 4) or layer(s) arranged thereupon or therebetween by laminating and/or embossing at temperatures of from 100 to 190° C., preferably from 110 to 180° C., or by coextrusion at melt temperatures of from 230 to 270° C.

Preferably, the upper and/or lower side of the base layer(s) or base film(s) is subjected to a surface treatment to activate the surface before application of the bonding layer or adhesion-promoting layer or reactant layer (1, 3). The surface treatment is preferably a corona treatment, fluorination, plasma treatment or flame treatment.

Turning now to the drawings, in all of FIGS. 1 to 6 at least one bonding layer, adhesion-promoting layer or reactant layer (1) has been arranged (on the side facing the working material) below the base film or base layer.

Figure 1:
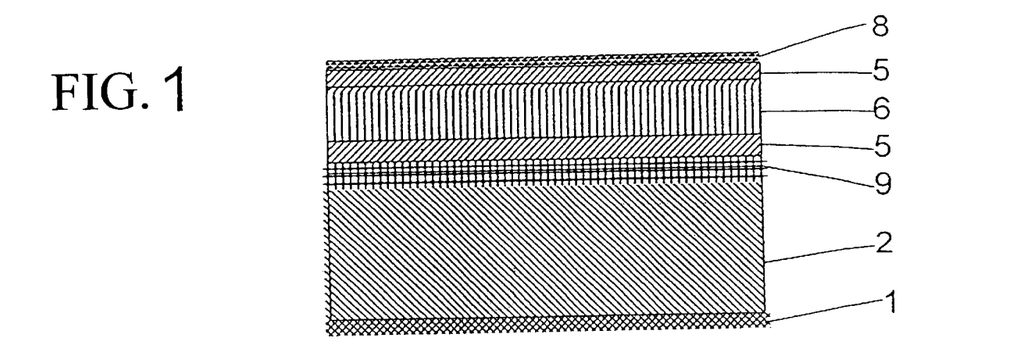
FIGS. 1 to 6 give a schematic representation of the invention, the composition of which is also given via the examples. The figures show cross sections through the novel films.
Figure 2:
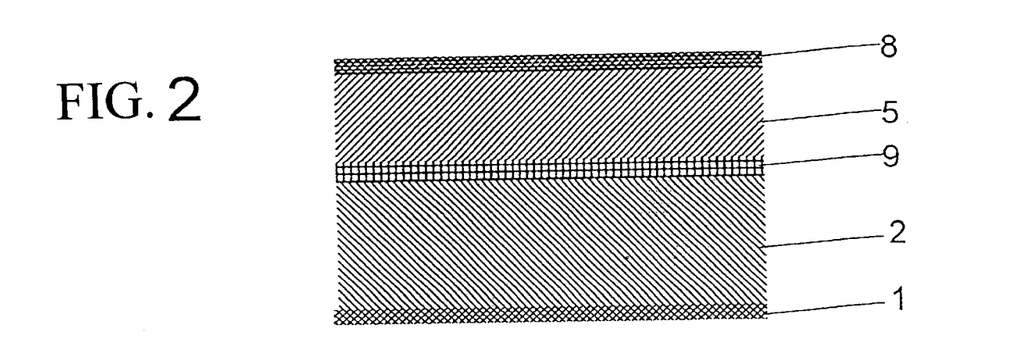

The arrangement in FIGS. 1 and 2 includes, below the base film (2), the bonding layer, adhesion-promoting layer or reactant layer (1) and, above the base film (2), the bonding layer or bonding film (9). Above this in FIG. 2 is the polyester layer amorphous polyester—and, directly thereupon, the surface-coating layer (8), whereas the arrangement in FIG. 1 includes, above the bonding layer (9) and the layer made from amorphous polyester (5), the further polyester layers (6) and (5), and only then the surface-coating layer (8).

Figure 3:
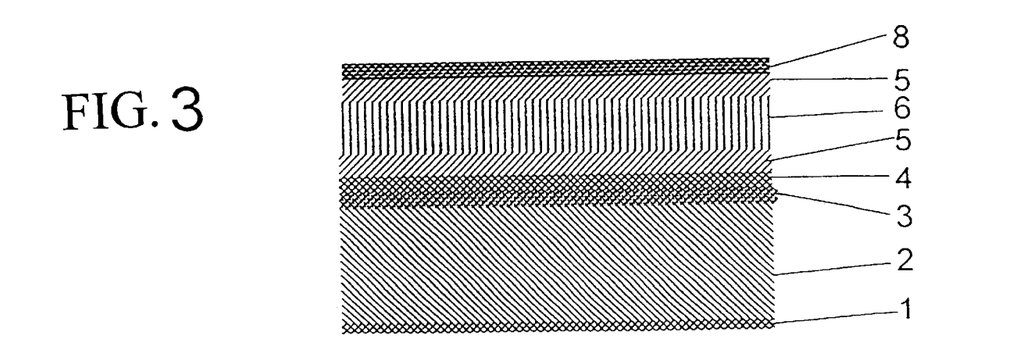
Figure 4:
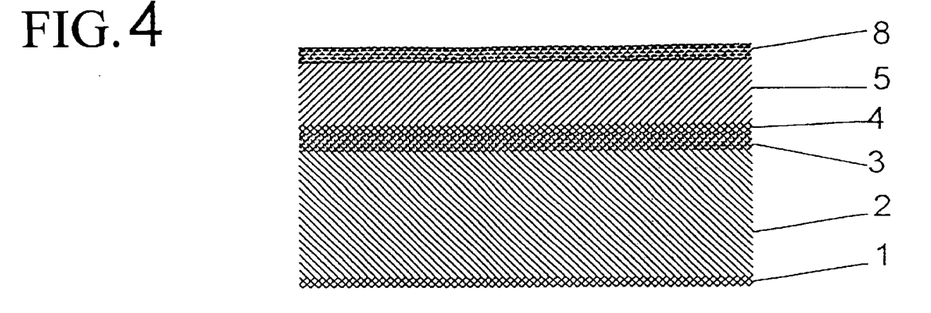
Figure 5:
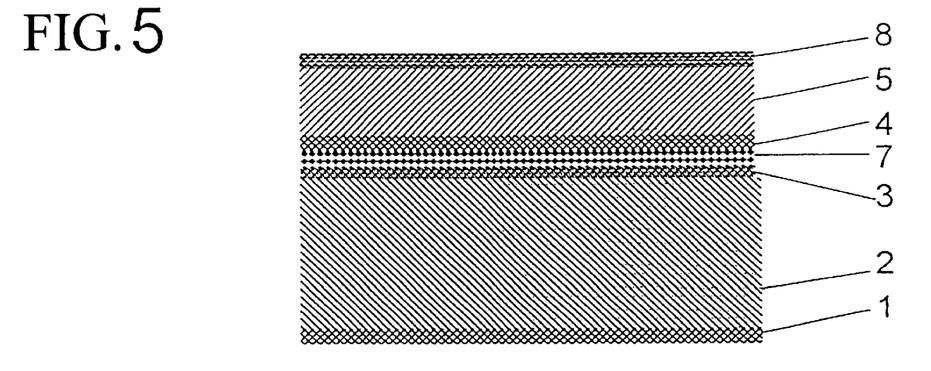
Figure 6:
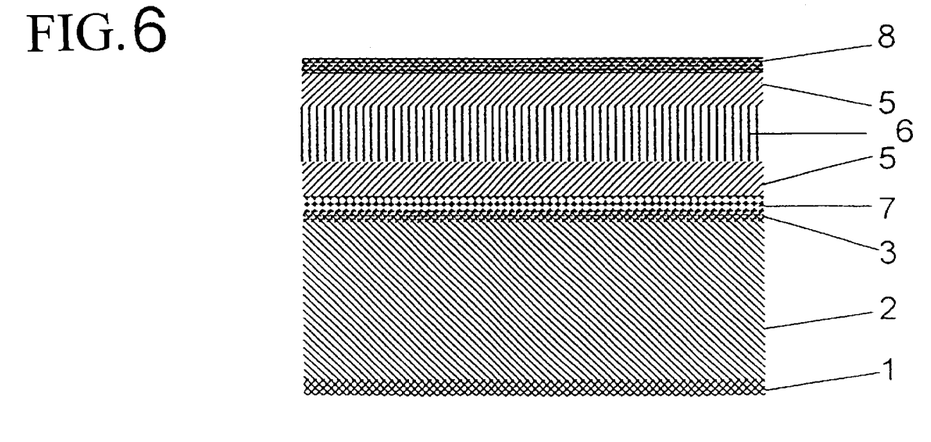

The embodiment of FIGS. 1 to 4 shows composite films without the color-printing layer (7) which is visible in the film structure of FIGS. 5 and 6.

The arrangement in FIGS. 3 and 4 includes, above the base film (2), the bonding layer(s) (3) and (4), whereas in the embodiments of FIGS. 5 and 6 the color-printing layer (7) is located above the bonding layer (3).

The arrangement in FIG. 5 includes, above the color-printing layer (7), the bonding layer (4), the polyester layer (5) and the surface-coating layer (8), whereas in FIG. 6 the polyester layers (5), (6) and (5) follow directly upon the color-printing layer (7) and the surface-coating layer (8) has been arranged thereupon.

According to the invention, the process is used for producing furniture parts. For this, the veneer film having more than one layer is applied to the previously produced parts of wood or of wood materials, or boards of wood or of wood materials or comprising wood fibers, using the bonding layer, adhesion-promoting layer or reactant layer (1) arranged below the base film or base layer (2), either by means of the hot-melt adhesive applied as claimed in claim 17 or with use of an adhesive or glue, preferably with the use of a 2-part adhesive or glue (PU), and bonded to the parts or boards of wood or of wood materials.

In a preferred embodiment, the composite synthetic polymer film is embossed during production or thereafter, or at least one or more of the upper layers or films of the composite film and/or with the surface-coating layer or protective layer are provided with an embossment.

The invention further provides the use of the veneer films having one or more layer, where the veneer films preferably have at least the following structure or composition:

one base film or base layer (2) of polyolefin or comprising polyolefin and having a thickness of 100 to 500 μm which comprises, based on 100 parts by weight of polyolefin, from 0 to 90 parts by weight of at least one inorganic and/or organic filler pigment or filler-pigment mixture and at least one UV stabilizer and/or heat stabilizer and/or antioxidant, at least one intermediate layer (3 and/or 9) in the form of at least one primer layer, bonding layer or bonding film and, arranged thereupon, at least one printing layer, coloring layer or color-printing layer (7) arranged over part or all of the surface and, arranged directly thereupon or onto one or more bonding layer(s) (4), at least one polyester-containing single- or multiple-layer-structure layer (5 and/or 6) or film, where a bonding layer, adhesion-promoting layer or reactant layer (1) has been arranged below the base film or base layer (2), directed toward the wood on the side facing the working material, or toward the adhesive-coated side of the wood. This veneer film is used to produce or furniture elements provided with decorative effects and having, for decorative effect, on at least one surface, preferably a frontal decorative area or a lateral decorative area or a frontal decorative board or a lateral decorative board, elevations and or depressions or cutouts. The veneer film preferably comprises the following structure or the following composition at least one polyolefin-containing base layer or base film (2) which comprises at least three synthetic polymers selected from the classes of (a) at least one propylene copolymer, preferably random propylene copolymer with a moderate or high ethylene content, and/or a propylene terpolymer, which has or, respectively, have a Vicat softening point VST/A/50 of from 110 to 130° C. and a melt index MFR (230/2.16) of from 1 to 10 g/10 min, and (b) at least one polyethylene, preferably LDPE, LLDPE, VLDPE and/or VLLDPE, and also (c) at least one polyethylene elastomer or polyethylene-containing elastomer, where at least one, or the entire, base layer(s) or base film(s) (2) has or, respectively, have a Vicat softening point VST/A/50 of from 60 to 90° C., and the arrangement includes one or more film(s) (5, 6) or layer(s) of polyester or comprising polyester, of which at least one polyester layer or polyester-containing layer or film (5) comprises an amorphous polyester or is composed of the same, and at least one, or the entire, layer (5 and/or 6) or film of polyester or comprising polyester has or, respectively, have a Vicat softening point VST/A/50 of from 60 to 90° C.

The novel film may be used as a covering for parts made from wood or from wood materials, boards made from wood or wood materials, plasterboard, metal, or parts or sheets made from metal. A further use is that of the film for producing door coverings, laminate floor coverings, housings for phono equipment, wall panels or the like.

The following processes are preferably carried out for the purposes of the present invention:

PROCESS EXAMPLES (P)

P1 a) Layers (2, 9, 5, 6, 5) are coextruded and the composite is then embossed, preferably embossed simultaneously in a single operation.

b) The coextrudate (2, 9, 5, 6, 5) is then, in a single operation, surface-coated (8) and the reverse side primed (1), and this is preferably carried out in a single operation.

P2 a) Layers (2, 9, 5) are coextruded and the composite is then embossed, preferably embossed simultaneously in a single operation.

b) The coextrudate (2, 9, 5) is then surface-coated (8) and the reverse side is primed (1), and again this can be carried out in a single operation.

P3 a) Layers (5, 6, 5) are coextruded and surface-coated in a second operation.

b) The calendered or extruded base film (2) is provided on the reverse side with layer (1) and on the front side with layer (3) and layer (4), preferably in a single operation.

c) Lamination of (a) and (b) and embossing in a single operation.

P4 a) Layer (5) is extruded and surface-coated (8) in a second operation.

b) as P3 (b).

c) as P3 (c).

P5 a) Upper film (5) is extruded and then surface-coated (8) in a second operation.

b) The calendered or extruded base film (2) is provided with layer (1), layer (3), printing layer (7) and bonding layer (4) in a single operation.

c) Lamination of (a) and (b) and embossing in a single operation.

P6 a) Layers (5, 6, 5,) are coextruded and then surface-coated (8) in a second operation.

b) The calendered or extruded base film (2) is provided with layer (1), layer (3) and printing layer (7) in a single operation.

c) Lamination of (a) and (b) and embossing in a single operation.

EXAMPLE 1

Coextruded Unifilm

1. Bonding layer composed of
   linear PU, polyisocyanate, fillers, auxiliaries
2. PO base layer composed of
   60 parts of PP random copolymer MFR (230/2.16)–4.0 g/10 min
   20 parts of LLDPE (MFR (190/2.16)–2.5 g/10 min
   20 parts of PE elastomer (POE) MFR (190/2.16)–5.0 g/10 min
9. Bonding layer composed of
   E/GMA (ethylene-glycidyl methacrylate copolymer MFR (190/216)–5.0 g/10 min
5. Layer composed of
   amorphous polyester (PETG):
   40% by weight of polyethylene terephthalate and
   60% by weight of cyclohexanedimethanol (CHDM)
6. Layer composed of
   semicrystalline polyester (A-PET) modified using comonomers, such as isophthalic acid (IPA), cyclohexanedimethanol (CHDM), diethylene glycol (DEG) or naphthalenedicarboxylate (NDC)
8. Surface-coated layer composed of
   2-component PU lacquer
   Layers 2, 9, 5, 6, 5 are coextruded Here and in the examples below POE means polyethylene elastomer or polyethylene-containing elastomer and may preferably be in the form of ethylene-octene copolymer, ethylene-hexene copolymer and/or ethylene-butene copolymer.

EXAMPLE 2

Coextruded Unifilm

1. Bonding layer composed of
   linear PU, polyisocyanate, fillers, auxiliaries
2. PO base layer composed of
   60 parts of PP random copolymer MFR (230/2.16)–4.0 g/10 min
   20 parts of LLDPE (MFR (190/2.16)–2.5 g/10 min
   20 parts of PE elastomer (POE) MPR (190/2.16)–5.0 g/10 min
9. Bonding layer composed of
   EVA (28% of VA)+MAH (3%) MFR (190/2.16)–6.0 g/10 min
   Ethylene vinyl acetate (EVA)+maleic anhydride (MAH) as terpolymer
5. Layer composed of
   amorphous polyester (PETG):
   40% by weight of polyethylene terephthalate and
   60% by weight of cyclohexanedimethanol (CHDM)
8. Surface-coating layer composed of
   UV lacquer (mixture of monomer-prepolymer-acrylates, UV initiators, auxiliaries, matting agents)
   Layers 2, 9, 5 are coextruded.

EXAMPLE 3

Laminated Unifilm

1. Bonding layer composed of
   linear PU, polyisocyanate, fillers, auxiliaries
2. Base layer composed of
   65 parts of PP random copolymer MFR (230/2.16)–6.0 g/10 min
   20 parts of LLDPE (MFR (190/2.16)–3.0 g/10 min
   15 parts of PE elastomer (POE) MFR (190/2.16)–5.0 g/10 min
3. Bonding layer composed of
   polyacrylate containing OH groups, polyisocyanate, fillers, auxiliaries
4. Bonding layer composed of
   PVC-PVA copolymer
   (40% of vinyl acetate and 60% of vinyl chloride)
5. Layer composed of
   amorphous polyester (PETG):
   40% by weight of polyethylene terephthalate and
   60% by weight of cyclohexanedimethanol (CHDM)
6. Layer composed of
   semicrystalline modified polyester (A-PET)
8. Surface-containing layer composed of
   polyacrylate containing OH groups, polyisocyanate, matting agent, auxiliaries
   Layers 5, 6, 5 are coextruded.

EXAMPLE 4

As Example 3, but upper layer (5) single-layer structure of PETG and layer (4) of an HCPU-type layer (1)

EXAMPLE 5

Printed Film

1. Bonding layer composed of
   linear PU, polyisocyanate, fillers, auxiliaries
2. PO base layer composed of
   50 parts of PP random copolymer MFR (230/2.16)–5.0 g/10 min
   20 parts of LLDPE (MFR (190/2.16)–3.5 g/10 min
   30 parts of PE elastomer (POE) MFR (190/2.16)–5.0 g/10 min
3. Bonding layer composed of
   polyacrylate containing OH groups, polyisocyanate, silica, auxiliaries
7. Printing layers composed of
   acrylate binder and pigments
4. Bonding layer composed of
   linear non-crosslinkable PU, PVC copolymer, polyisocyanate, fillers, auxiliaries
5. Cover layer composed of
   amorphous polyester (PETG):
   40% by weight polyethylene terephthalate and
   60% by weight of cyclohexanedimethanol (CHDM)
8. Surface-coating layer composed of
   2-component PU lacquer

EXAMPLE 6

Printed Film

As Example 5, but with coextruded cover layer (5, 6, 5) composed of
5. Layer composed of
   amorphous polyester (PETG):
   40% by weight of polyethylene terephthalate and
   60% by weight of cyclohexanedimethanol (CHDM)
6. Layer composed of
   semicrystalline modified polyester (A-PET)
7. Printing layer composed of
   PVC binder and pigments
8. Surface-coating layer composed of
   polyacrylate containing OH groups, polyisocyanate, matting agent, auxiliaries.

In all of the examples mentioned above the ethylene content values (of the PP random copolymer (a)), the octene contents for (b) and the octene contents, hexene contents or butene contents for (c) as constituents of the base film or base layer and for the Vicat softening points, and also other values, were within the values or parameters mentioned in the Description.

The film having more than one layer, preferably a thermoformable composite synthetic veneer film, comprises at least the base film or base layer (2) of polyolefin or comprising polyolefin, the intermediate layer in the form of at least one primer layer, bonding layer (3) or bonding film (9) or, respectively, bonding layer and, arranged directly thereupon or onto a printing layer, coloring layer or color-printing layer (7) arranged over part or all of the surface and, arranged directly thereupon or onto a bonding layer (4), at least one polyester-containing single- or multiple-layer-structure layer (5 and/or 6) or film.

The invention has been described with reference to several preferred embodiments set forth above. It is understood that the invention contemplates numerous other embodiments that come within the broader description provided above and that these other embodiments can be arrived at by making changes and modifications that are suggested by the disclosure in this application or would be apparent to persons or ordinary skill in the art from the disclosure of this application.

What is claimed is:

1. A multilayer thermoformable composite synthetic film, comprising:
   (1) at least one base layer comprising polyolefin and having a thickness of 100 to 500 μm, which comprises, based on 100 parts by weight of polyolefin, from 0 to 90 parts by weight of (i) at least one inorganic and/or organic filler, pigment or filler-pigment mixture, (ii) at least one UV stabilizer and/or (iii) heat stabilizer and/or (iv) antioxidant, wherein the base layer comprises (a) at least one propylene copolymer containing ethylene and having a Vicat softening point VST/A/50 of from 110 to 130° C. and a melt index MFR (230/2.16) of from 1 to 10 g/10 min, (b) at least one polyethylene, and (c) at least one polyethylene elastomer or polyethylene-containing elastomer;
   (2) at least one first intermediate bonding layer;
   (3) at least one polyester-containing layer comprising an amorphous polyester having a Vicat softening point VST/A/50 of from 60 to 90° C.;
   (4) at least one bonding layer, adhesion-promoting layer or reactant layer arranged on the underside of the base layer; and (5) a surface-covering layer arranged on top of the film.

2. A film as claimed in claim 1, wherein the propylene copolymer (a) comprises a random propylene copolymer and/or a propylene terpolymer, and wherein the polyethylene (b) comprises LDPE, LLDPE or VLDPE.

3. A film as claimed in claim 2, wherein the LDPE, LLDPE and/or VLDPE present in the base layer comprises an octene-containing or octene-modified LDPE, LLDPE and/or VLDPE.

4. A film as claimed in claim 1, further comprising a continuous or discontinuous printing layer, coloring layer or color-printing layer arranged between the base layer (1) and the polyester-containing layer (3).

5. A film as claimed in claim 4, further comprising, above the printing layer, coloring layer or color-printing layer at least one second bonding layer, which is transparent and substantially free from fillers.

6. A film as claimed in claim 5, wherein the second bonding layer comprises, as binder, a polyurethane (PU), a polyisocyanate, a vinyl chloride homo-, co- or terpolymer and/or polyvinyl acetate and/or a vinyl chloride-vinyl acetate copolymer (PVC-PVA copolymer) or a mixture of two or more of these polymers.

7. A film as claimed in claim 1, wherein the polyethylene elastomer or polyethylene-containing elastomer (c) comprises a butene-containing, hexene-containing or octene-containing, or butene-modified, hexene-modified or octene-modified polyethylene elastomer or polyethylene-containing elastomer, which has a melt index MFR (190/2.16) of from 3 to 8 g/10 min.

8. A film as claimed in claim 7, wherein the butene-containing, hexene-containing or octene-containing, or butene-modified, hexene-modified or octene-modified, polyethylene elastomer or polyethylene-containing elastomer has a butene content, hexene content or octene content of
from 10 to 35% by weight,
(based on 100 parts by weight of elastomer).

9. A film as claimed in claim 1, wherein the base layer comprises
from 35 to 65 parts by weight,
of random propylene copolymer and/or of propylene terpolymer (a) and from 20 to 40 parts by weight,
of butene-containing, hexene-containing or octene-containing, or butene-modified, hexene-modified or octene-modified, polyethylene elastomer or polyethylene-containing elastomer (c), and also
from 10 to 30 parts by weight,
of LDPE, LLDPE and/or VLDPE (b) with an MFR (190/2.16) of from 2.5 to 7.5 g/10 min.

10. A film as claimed in claim 1, comprising from 0 to 70 parts by weight of filler, based on 100 parts by weight of polymer, in the base layer.

11. A film as claimed in claim 1, wherein the at least one first intermediate bonding layer comprises an acrylate or methacrylate, where the polyester-containing layer has been coextruded together with the bonding layer.

12. A film as claimed in claim 11, wherein the acrylate or methacrylate comprises E/GMA (ethylene-glycidyl methacrylate copolymer) and/or E/MA/GMA (ethylene-methacrylate-glycidyl methacrylate terpolymer), with a melt index MFR (190/2.16) of from 3 to 7 g/10 min.

13. A film as claimed in claim 1, wherein the ethylene content of the propylene copolymer in the base layer is from 2 to 8% by weight, based on the propylene copolymer.

14. A film as claimed in claim 1, wherein the Vicat softening point VST/A/50 of the base layer is from 60 to 90° C. and/or the melt index MFR (230/2.16) of the propylene copolymer (a) of the base layer is from 2 to 8 g/10 min.

15. A film as claimed in claim 1, wherein the layer (4) comprises, at least one water-soluble, water-swellable or water-insoluble filler-containing bonding layer, adhesion-promoting layer and/or a reactant layer which, (i) in the case of the water-soluble or water-swellable bonding layer or reactant layer, comprises, a binder, an agent reacting with an adhesive layer to be applied, or comprises a water-soluble cationic polymer, or, (ii) in the case of a water-insoluble or low-water-solubility bonding layer or adhesion-promoting layer, comprises a synthetic polymer containing polar groups.

16. A film as claimed in claim 15, wherein the synthetic polymer containing polar groups comprises at least one polyacrylate, polyester, polyurethane and/or a polyisocyanate.

17. A film as claimed in claim 1, wherein the at least one first intermediate bonding layer comprises a reaction product of a crosslinkable polyacrylate containing OH groups with a polyisocyanate, and/or comprises an alloy or a mixture of these compounds with one another.

18. A film as claimed in claim 17, wherein the at least one first intermediate bonding layer comprises a polyacrylate containing OH groups and having from 1.5 to 5% by weight of OH groups (based on the polyacrylate containing OH groups) and/or wherein the polyisocyanate has an isocyanate content of from 1 to 5% by weight (based on the entire reaction product).

19. A film as claimed in claim 1, wherein the layer(s) containing polyester is/are transparent or translucent, comprise from 0 to 8% by weight of filler, based on the entire polyester layer, and the total thickness of the layer(s) is from 20 to 250 μm and/or at least one polyester-containing layer has a Vicat softening point (VST/A/50 of from 60 to 90° C.).

20. A film as claimed in claim 1, wherein the base layer comprises a propylene terpolymer with a butene content, hexene content or octene content of from 2 to 30% by weight.

21. A plastic film as claimed in claim 1, further comprising, either directly below the base layer or below the reactant layer, adhesion-promoting layer or bonding layer arranged below the base layer, a hot-melt adhesive comprising a polyurethane, polyamide, polyethylene or polypropylene applied at a layer thickness of from 30 to 200 μm.

22. A plastic film as claimed in claim 1, wherein the polyester-containing layer comprises at least two layers of different polyester-containing material.

23. A plastic film as claimed in claim 22, wherein the at least two layers of polyester-containing material comprise a first layer of amorphous polyester material and a second layer of semicrystalline polyester material.

24. A process for producing a multilayer thermoformable composite synthetic veneer film according to claim 1, comprising extruding at least one base layer, wherein said base layer has a Vicat softening point VST/A/50 of from 70 to 80° C., and/or the melt index MFR (230° C./2.16) of the propylene copolymer is selected at 2 to 8 g/10 min, prior to the extrusion.

25. A process as claimed in claim 24, wherein the polyethylene elastomer or polyethylene-containing elastomer comprises a butene-containing, hexene-containing or octene-containing, or butene-modified, hexene-modified or octene-modified polyethylene elastomer or polyethylene-containing elastomer, which has a melt index MFR (190/2.16) of from 3 to 8 g/10 min.

26. A process as claimed in claim 24, wherein the propylene copolymer (a) comprises a random propylene copolymer and/or a propylene terpolymer, and wherein the polyethylene (b) comprises LDPE, LLDPE or VLDPE.

27. A process as claimed in claim 26, wherein the LDPE, LLDPE and/or VLDPE used comprises an octene-containing or octene-modified LDPE, LLDPE and/or VLDPE, in the base layer and the polyethylene elastomer used comprises a polyethylene-containing elastomer with a butene content, hexene content or octene content of from 10 to 35% by (based on 100 parts by weight of elastomer).

28. A process as claimed in claim 24, wherein the base layer comprises (as synthetic resin binder) a mixture of from 35 to 65 parts by weight of propylene copolymer and/or of propylene terpolymer (a) and from 20 to 40 parts by weight of butene-containing, hexene-containing or octene-containing, or butene-modified, hexene-modified or octene-modified elastomer (c), comprising polyethylene, and also from 10 to 30 parts by weight of LDPE, LLDPE and/or VLDPE (b) with an MFR (190/2.16) of from 2.5 to 7.5 g/10 min.

29. A process as claimed in claim 24, wherein the layer(s) of polyester-containing material are combined with the base layer and, optionally, with one or more of the other layer(s) arranged thereon, by laminating and/or embossing at temperatures of from 100 to 190° C. or by coextrusion at melt temperatures of from 230 to 270° C.

30. A process as claimed in claim 24, wherein the upper and/or lower side of the base layer(s) is subjected to a surface treatment to activate the surface before applying the bonding layer.

31. A process as claimed in claim 30, wherein the surface treatment carried out is a corona treatment, fluorination, plasma treatment or flame treatment.

32. A process for producing furniture parts using the film, which comprises applying, in a thermoforming process and at temperatures of from 80 to 140° C. the veneer film as claimed in claim 1 to a previously produced part comprising wood or wood material, using the bonding layer, adhesion-promoting layer or reactant layer arranged below the base layer, and bonding to the parts or boards comprising wood or wood material.

33. A process for producing furniture parts as claimed in claim 32, wherein the bonding is done either by means of a hot-melt adhesive or with use of a 2-part adhesive or glue.

34. A laminated article comprising a base part comprising wood or wood material, plasterboard, or metal, laminated with a film as claimed in claim 1.

35. A laminated article as claimed in claim 34, selected from the group consisting of a door covering, a laminated floorcovering, a housing for audio equipment and a wall panel.

* * * * *